Patented June 16, 1942

UNITED STATES PATENT OFFICE 2,286,344

2,286,344

PROCESS OF REFINING HYDROCARBON OIL

Vladimir L. Chechot, Philadelphia, Pa., assignor to The Atlantic Refining Company, Philadelphia, Pa., a corporation of Pennsylvania No Drawing. Application February 16, 1940, Serial No. 319,262

9 Claims. (Cl. 196—40)

The present invention relates to the refining of hydrocarbon oils, and more particularly to the sulfuric acid refining of mineral oils for the production of mineral white oils and technical white oils.

The principal object of this invention is the provision of a method of acid treating hydrocarbon oils whereby the acid sludge produced is soft and readily pumpable, and the time required for settling and removal of acid sludge from the treated oil is reduced to a minimum.

Heretofore it has been conventional practice to produce mineral white oil by treating a viscous hydrocarbon oil distillate with from about 35% to about 50% by volume of fuming sulfuric acid, the acid being applied in a plurality of dumps, usually of the order of 7 to 10 dumps of 5% by volume each. After each application of acid, the mixture was agitated for about 30 to 45 minutes and then permitted to settle for a period of time sufficient to effect stratification of the acid sludge, and the sludge was then removed prior to the addition of the next dump of acid. The time required for settling and removal of acid sludge after each dump was generally of the order of from about 8 to about 24 hours, the aggregate time of settling for an average 9-dump treat being about 100 to 110 hours. Furthermore, the acid sludge resulting from the 1st and 2nd acid dump was invariably hard, coky, and very difficult if not impossible to pump.

I have found that the above-mentioned difficulties may be minimized by employing, in lieu of an extended series of treatments each involving acid addition, agitation, settling, and sludge removal, a simplified process comprising a multiple-stage treatment of not less than 3 nor more than 4 stages, with settling and removal of acid sludge only upon the completion of each stage. In accordance with my improved process at least 2 of the treating stages comprise not less than 2 separate and successive steps of acid addition and agitation, and preferably the 1st stage of my process comprises at least 3 separate and successive steps of acid addition and agitation, acid sludge being settled and drawn only at the completion of each stage of treatment, and not between each acid addition or acid dump as practiced heretofore. The acid treated oil may thereafter be neutralized and finished to specification as desired.

My invention may be further illustrated by the following examples, which, however, are not intended as limiting the scope thereof:

Hydrocarbon oil distillate, having a Saybolt universal viscosity of 760" at 100° F. and an A. P. I. gravity of 22°, was subjected to treatment with 45% by volume of fuming sulfuric acid in 3 stages. In the 1st stage, four successive dumps of 5% by volume each of fuming sulfuric acid were applied to the oil, each dump of acid being added at 20 minute intervals, agitation with air being continuous throughout the entire stage, and no acid sludge being settled or drawn until completion of the agitation period following the addition of the 4th dump of acid. The temperature of the oil at the beginning of the 1st stage treatment was 60° F. and at the completion of the 4th dump of the 1st stage was 108° F. The mixture, at the completion of the 4th dump treatment was settled for 8 hours and the composite sludge then drawn. The oil layer, at the end of the settling period was clear and free of finely-divided sludge or "pepper," and the composite sludge was soft and readily pumpable. The partially treated oil was then subjected to a 2nd stage treatment of 3 dumps of 5% by volume each of fuming sulfuric acid, similar in all respects to the 4-dump treatment in the 1st stage. At the completion of the agitation period following the 3rd dump of acid, the sludge was settled for 8 hours and then drawn. And, finally, the oil was again subjected to a 3rd stage treatment of 2 dumps of 5% by volume each of fuming sulfuric acid, similar to the preceding 3-dump treatment. At the completion of the 3rd stage treatment, the sludge was settled for 8 hours and drawn, the oil being clear, light colored, and free from pepper. The sludges drawn at the end of the 2nd and 3rd stages were very soft and even liquid and therefore readily pumpable.

The acid treated oil was then neutralized by agitation with a small quantity of aqueous sodium hydroxide solution of about 50° Bé. gravity and thereafter settled to effect stratification of the oil and the spent sodium hydroxide solution containing salts and water-soluble sulfonic acid soaps. The spent solution was separated from the oil, and the latter was agitated with about 25% by volume of a 50-50 mixture of isopropyl alcohol and water, whereby extraction from the oil of residual alkali and oil-soluble sulfonic acid soaps was effected. The alcoholic extract was then settled from the oil and removed, and the oil was thereafter spray-washed with water and brightened by air blowing at a temperature of about 160° F. The brightened oil was then filtered through a decolorizing adsorbent such as granular fuller's earth or clay to produce finished white oil having a Saybolt universal viscosity of 360" at 100° F., an A. P. I. gravity of 24°, and conforming to U. S. P. specifications for medicinal white oil.

In the treatment of hydrocarbon oils having viscosities of from about 100 to 1000 seconds Saybolt universal at 100° F., for the production of medicinal and technical white oils, I prefer to maintain the treating temperature in the 1st stage treatment below about 135° F., and preferably between about 60° F. and 100° F. In the 2nd, 3rd and/or 4th stages the treating temperatures may be increased, but are not permitted to exceed about 160° F. The time intervals between the successive additions of acid, or in other words, the period of agitation following each dump of acid, may vary from about 15 to about 60 minutes, the preferred period of agitation being of the order of 20 to 35 minutes. The concentration of the acid employed may be varied from about 93% to about 104% (fuming) sulfuric acid, and the quantity of acid per dump may be varied as desired, the most convenient quantity being about 5% by volume of the oil to be treated. For example, in the 1st stage treatment I may utilize 93%! or 98% sulfuric acid, and in the 2nd, 3rd or 4th stage fuming sulfuric acid may be used. By employing acid less concentrated than fuming acid in the 1st stage, the treating temperature may be kept below about 135° F., without resort to refrigeration. In the production of medicinal white oils it is usually necessary to employ a total quantity of fuming sulfuric acid amounting to about 45% or 50% of the oil charged, whereas in the production of technical while oils, lesser quantities of acid may be utilized, i. e., of the order of 35% to 40% by volume.

In the following table are presented data obtained in accordance with the practice of my invention. The treating procedure employed was generally the same as that hereinabove described, variations being made in the number of stages employed, the number of dumps and concentration of acid per stage, the period of agitation, and the treating temperature. The last example in the table, presented for purposes of comparison, represents the conditions and results of a conventional 9-dump process with settling and removal of sludge after each dump. The oil stock employed was an East Texas crude oil distillate having a Saybolt universal viscosity of 760" at 100° F., and an A. P. I. gravity of 22°, and the finished oils produced all conformed to U. S. P. specifications for medicinal white oils.

| Treating stage | Conditions of acid treatment | | | | | | Yield | |
|---|---|---|---|---|---|---|---|---|
| | Number of acid dumps per stage without drawing sludge | Agitation period per dump | Treating temp. | Settling period | Sludge | Oil | Sour oil | Finished oil, bbls. per ton of clay |
| | | Minutes | °F. | Hours | | | Percent | |
| 1 | 4×5% fuming H₂SO₄ | 20 | 60–108 | 8 | Soft | Clear | | |
| 2 | 3×5% fuming H₂SO₄ | 20 | 80 | 8 | do | do | | |
| 3 | 1×5% fuming H₂SO₄ | 20 | 80 | 8 | Liquid | do | | |
| 4 | 1×5% fuming H₂SO₄ | 20 | 80 | 8 | do | do | 74.2 | 62.4 |
| 1 | 4×5% fuming H₂SO₄ | 20 | 60–108 | 8 | Soft | Clear | | |
| 2 | 4×5% fuming H₂SO₄ | 20 | 80 | 8 | do | do | | |
| 3 | 1×5% fuming H₂SO₄ | 20 | 80 | 8 | Liquid | do | 67.6 | 81.6 |
| 1 | {2×5% 98% H₂SO₄ / 1×5% fuming H₂SO₄} | 30 | 80–100 | 8 | Soft | Clear | | |
| 2 | 3×5% fuming H₂SO₄ | 40 | 80 | 8 | do | do | | |
| 3 | 3×5% fuming H₂SO₄ | 60 | 80 | 8 | do | do | | |
| 4 | 1×1.5% 78% H₂SO₄ | 30 | 80 | 8 | Liquid | do | 57.2 | 81.6 |
| 1 | 4×5% fuming H₂SO₄ | 20 | 60–108 | 8 | Soft | Clear | | |
| 2 | 3×5% fuming H₂SO₄ | 40 | 80 | 8 | do | do | | |
| 3 | 2×5% fuming H₂SO₄ | 60 | 80 | 8 | do | do | 71.3 | 72.0 |
| 1 | 4×5% fuming H₂SO₄ | 20 | 60–108 | 8 | Soft | Clear | | |
| 2 | 2×5% fuming H₂SO₄ | 20 | 80 | 8 | do | do | | |
| 3 | 3×5% fuming H₂SO₄ | 20 | 80 | 8 | do | do | 71.0 | 76.8 |
| 1 | 4×5% fuming H₂SO₄ | 35 | 52–134 | 8 | Soft | Clear | | |
| 2 | 3×5% fuming H₂SO₄ | 35 | 97–127 | 8 | do | do | | |
| 3 | 2×5% fuming H₂SO₄ | 35 | 97–110 | 8 | do | do | 70.8 | 105.6 |
| 1 | 1×5% fuming H₂SO₄ | 20 | 80 | 8 | Hard | Hazy | | |
| 2 | do | 20 | 80 | 8 | do | do | | |
| 3 | do | 20 | 80 | 10 | do | do | | |
| 4 | do | 20 | 80 | 10 | Soft | do | | |
| 5 | do | 20 | 80 | 10 | do | do | | |
| 6 | do | 20 | 80 | 10 | do | do | | |
| 7 | do | 20 | 80 | 10 | do | do | | |
| 8 | do | 20 | 80 | 10 | do | do | | |
| 9 | do | 20 | 80 | 10 | do | do | 64.8 | 67.2 |

From the data above presented it will be apparent that, in accordance with my invention, I am able to obtain acid sludges which are soft or liquid and readily pumpable, as contrasted with the hard, coky sludges produced in the first stages of a convention process, and that I obtain generally higher yields of filtered oil per ton of clay than are obtained in accordance with conventional practice. And, finally, I effect a great economy in sludge settling time, which in my 3-stage process is of the order of 24 hours, and in my 4-stage process about 32 hours, as compared with 86 hours in a conventional 9-dump process with settling and removal of sludge after each dump.

While in the above examples, I have shown several variations of my multiple stage treatment, I may employ various other combinations such as those set forth below.

| Stage number | Acid dumps per stage | | | | | | | | | | |
|---|---|---|---|---|---|---|---|---|---|---|---|
| | 3-STAGE TREATMENT | | | | | | | | | | |
| 1 | 3 | 3 | 3 | 3 | 4 | 4 | 4 | 4 | 5 | 5 | 5 |
| 2 | 3 | 4 | 2 | 5 | 3 | 2 | 4 | 4 | 2 | 3 | 1 |
| 3 | 3 | 2 | 4 | 1 | 2 | 3 | 1 | 1 | 2 | 1 | 3 |
| | 4-STAGE TREATMENT | | | | | | | | | | |
| 1 | 3 | 3 | 3 | 3 | 3 | 4 | 4 | 4 | 4 | 4 | 4 |
| 2 | 1 | 4 | 3 | 3 | 2 | 4 | 2 | 2 | 1 | 1 | 1 |
| 3 | 2 | 1 | 2 | 1 | 3 | 1 | 1 | 2 | 2 | 3 | 1 |
| 4 | 3 | 1 | 1 | 2 | 1 | 1 | 2 | 1 | 2 | 1 | 1 |

In the above combinations I have employed a total of 9 acid dumps applied in 3 or 4 stages. I may, however, utilize a greater or less number of dumps, for example, 7, 8, or as many as 10 dumps in my 3 or 4 stage treatment.

While the process herein described accomplishes the objects of the present invention, it is to be understood that various modifications may be made without departing from the scope of the invention.

What I claim is:

1. In the production of mineral white oil by fuming sulfuric acid treatment, the method which comprises applying said fuming acid in a plurality of multiple-dump treatments, each of said treatments comprising a plurality of successive steps of acid addition and agitation, and removing acid sludge from the treated oil only upon the completion of each of said multiple-dump treatments.

2. In the production of mineral white oil by fuming sulfuric acid treatment, the improvement which comprises subjecting hydrocarbon oil to fuming sulfuric acid treatment in at least 3 stages and not more than 4 stages, at least 2 of said stages comprising not less than 2 separate and successive steps of acid addition and agitation, and removing acid sludge from said oil only at the completion of each of said stages of treatment.

3. In the production of mineral white oil by fuming sulfuric acid treatment, the improvement which comprises subjecting hydrocarbon oil to fuming sulfuric acid treatment in at least 3 stages and not more than 4 stages, at least the first of said stages comprising not less than 3 separate and successive steps of acid addition and agitation, and removing acid sludge from said oil only at the completion of each of said stages of treatment.

4. The process of producing mineral white oil, which comprises subjecting hydrocarbon oil to a multiple-stage treatment with fuming $H_2SO_4$ of not less than 3 nor more than 4 stages, the 1st stage comprising at least 3 separate and successive steps of acid addition and agitation without removal of acid sludge prior to completion of said 1st stage of treatment, and at least 1 other stage comprising not less than 2 separate and successive steps of acid addition and agitation without removal of acid sludge prior to completion of said stage of treatment.

5. The process as recited in claim 3, wherein the temperature of treatment in the first stage is less than substantially 135° F.

6. The process of producing mineral white oil, which comprises adding to hydrocarbon oil fuming sulfuric acid, agitating the oil with the acid for a period sufficient to cause sludging of components of the oil with the acid, and without removal of sludge from the oil, repeating the steps of acid addition and agitation at least twice and not more than three times without removal of sludge, thereafter settling and removing from the oil the combined sludges produced by the treatment aforesaid, again adding to the partially treated oil fuming sulfuric acid, agitating the mixture, and without removal of sludge from the oil, repeating the steps of acid addition and agitation at least once and not more than three times without removal of sludge, thereafter settling and removing from the oil the resulting combined sludges, finally subjecting the oil to at least one and not more than three treatments with fuming sulfuric acid, and thereafter settling and removing acid sludge from the treated oil.

7. The process of producing mineral white oil, which comprises subjecting hydrocarbon oil to at least 3 and not more than 4 treatments with fuming sulfuric acid without removal of acid sludge between treatments, settling and removing sludge upon completion of the last treatment, again subjecting the partially treated oil to at least 2 and not more than 4 treatments with fuming sulfuric acid without removal of acid sludge between treatments, settling and removing sludge upon completion of the last treatment, and finally subjecting the oil to at least 1 and not more than 3 treatments with fuming sulfuric acid, and thereafter settling and removing acid sludge from the treated oil.

8. The process of producing mineral white oil, which comprises subjecting hydrocarbon oil to 4 treatments each with about 5% by volume of fuming sulfuric acid without removal of acid sludge between treatments, settling and removing the combined sludges upon completion of the 4th treatment, again subjecting the partially treated oil to 3 treatments each with about 5% by volume of fuming sulfuric acid without removing acid sludge between treatments, settling and removing the combined sludges upon completion of the 3rd treatment, and finally subjecting the oil to 2 treatments each with about 5% by volume of fuming sulfuric acid, and thereafter settling and removing acid sludge from the treated oil.

9. The process of producing mineral white oil, which comprises subjecting hydrocarbon oil to 4 treatments each with about 5% by volume of fuming sulfuric acid without removal of acid sludge between treatments, settling and removing the combined sludges upon completion of the 4th treatment, again subjecting the partially treated oil to 3 treatments each with about 5% by volume of fuming sulfuric acid without removing acid sludge between treatments, settling and removing the combined sludges upon completion of the 3rd treatment, finally subjecting the oil to 2 treatments each with about 5% by volume of fuming sulfuric acid, thereafter settling and removing acid sludge from the treated oil, neutralizing the treated oil with an alkaline agent, separating the products of neutralization from the treated oil, and filtering the neutralized oil through a decolorizing adsorbent.

VLADIMIR L. CHECHOT.